United States Patent

[11] 3,573,461

[72] Inventor  Stig Arne Ohlsson
               Saab Aktiebolag, Linkoping, Sweden
[21] Appl. No. 812,101
[22] Filed     Apr. 1, 1969
[45] Patented  Apr. 6, 1971

[54] METHOD AND APPARATUS FOR TIMING EXPOSURES IN X-RAY PHOTOGRAPHY
     3 Claims, 3 Drawing Figs.
[52] U.S. Cl. ............................................. 250/95,
                                                         250/103
[51] Int. Cl. .................................. G03b 41/16,
                                       H05g 1/28, H05g 1/38
[50] Field of Search ................................ 250/93, 95,
                                                              103

[56]            References Cited
              UNITED STATES PATENTS
3,356,847  12/1967  Splain ........................... 250/95

FOREIGN PATENTS
752,971   7/1956   Great Britain ................ 250/95

Primary Examiner—James W. Lawrence
Assistant Examiner—A. L. Birch
Attorney—Ira Milton Jones ABSTRACT: In X-ray photography, prime pulses are produced at a frequency dependent upon intensity of radiation affecting the film. During a predetermined interval early in each exposure, for a time determined by (but not necessarily equal to) the interval of opening delay of the X-ray generator switch means, at least one additional pulse is generated for each prime pulse, the additional pulses being emitted in time-delayed relation to their prime pulses and to one another. A counter receives all pulses and issues a switch-off signal upon receiving the last of a predetermined total number of pulses. Thus, film is subjected to equal quanta of radiation at every exposure even though radiation intensity varies.

METHOD AND APPARATUS FOR TIMING EXPOSURES IN X-RAY PHOTOGRAPHY

This invention relates to a method and apparatus for X-ray photography, and more particularly to a method and automatic means for controlling the time of exposure of film to X-rays in accordance with the sensitivity of the film, the density of exposure desired, and the intensity of X-rays affecting the film.

In X-ray photography of live subjects, the photographic result is dependent upon the sensitivity of the film, the nature of the subject (i.e., its relative opacity or transparency to X-rays), the voltage across the X-ray tube (kv.-number), the emission current through the X-ray tube (ma.-number) and the exposure time. The kv.-number determines the contrastiness of the image of the film, in that contrast between substances of different X-ray opacity is greater at low kv.-numbers than at high ones. The ma.-number is selected in accordance with the opacity of the subject. The exposure time is so selected, in dependence upon the kv.-number chosen as to yield the desired exposure (blackening) of the film.

In apparatus for X-ray photography it has been known to provide an automatic exposure timer which comprised a transducer located in the path of X-rays that had passed through the subject and a condenser that was charged by the output from the transducer. When the condenser had been charged to a voltage corresponding to the desired quanta of radiation, it acted through an amplifier and a switch device to terminate energization of the X-ray tube.

One shortcoming in such prior apparatus was its relatively slow restoration interval, that is, the relatively long time it required after termination of each exposure to prepare itself for timing the next succeeding one. While not particularly disadvantageous in situations where there were substantial time intervals between successive exposures, it was very troublesome in X-ray motion picture photography (kinefluorography), when a rapid succession of exposures had to be made.

Another problem with prior apparatus had to do with the fact that in X-ray generators with mechanical switch devices there is usually a substantial delay interval between issuance of an opening signal to the switch device and the actual termination of radiation from the X-ray tube, due to mechanical inertia in the switch device. It will be apparent that this delay interval becomes critically important in kinefluorography and in X-ray photography (fluorography) with short exposure times, inasmuch as the delay interval can represent a substantial portion of the total exposure time.

One expedient heretofore employed to compensate for the inertia of the mechanical switch mechanism was to decrease by an arbitrary value the charge on the timing condenser that was to be effective in causing actuation of the switch device, so as to cause switch actuation to be initiated early. The critical condenser charge voltage for switch actuation was selected on the assumption that the quanta of X-rays affecting the film would remain substantially uniform from instant to instant during each exposure and from exposure to exposure during a sequence of exposures. In fact, however, this assumption was not always valid, and therefore the arbitrarily chosen delay compensation was incorrect for exposures in which average X-ray intensity on the film was substantially higher or lower than that for which the compensation was chosen.

With the foregoing observations in mind, it is the general object of this invention to provide improved means for automatically timing the energization of an X-ray tube to produce desired quanta of radiation, whereby the timing apparatus is accurately responsive to the quanta of radiation delivered from instant to instant during the course of each exposure, so as to have high accuracy under conditions where radiation affecting the film is varying substantially from exposure to exposure, and whereby very accurate automatic compensation is made for mechanical delay in the switch means that terminates X-ray generation.

Another object of this invention is to provide improved automatic exposure timing means for X-ray photographic apparatus, which timing means is ready for timing a new exposure immediately upon termination of radiation for a preceding one.

It is another and more specific object of this invention to provide exposure timing means for X-ray photography apparatus of the character described that provides automatic compensation for the delay interval due to the mechanical inertia of the switch means, and in doing so takes account of the intensity of radiation during the portion of the exposure interval preceding issuance of a switch-opening impulse to the switch means, so that said impulse is issued at a time such that the total quanta of radiation delivered throughout the exposure will be almost exactly that desired, even in cases where radiation intensity varies substantially from exposure to exposure.

With these observations and objects in mind, the manner in which the invention achieves its purpose will be appreciated from the following description and the accompanying drawings. This disclosure is intended merely to exemplify the invention. The invention is not limited to the particular structure or method disclosed, and changes can be made therein which lie within the scope of the appended claims without departing from the invention.

The drawings illustrate one complete example of the physical embodiment of the invention constructed according to the best mode so far devised for the practical application of the principles thereof, and in which.

Figure 1:
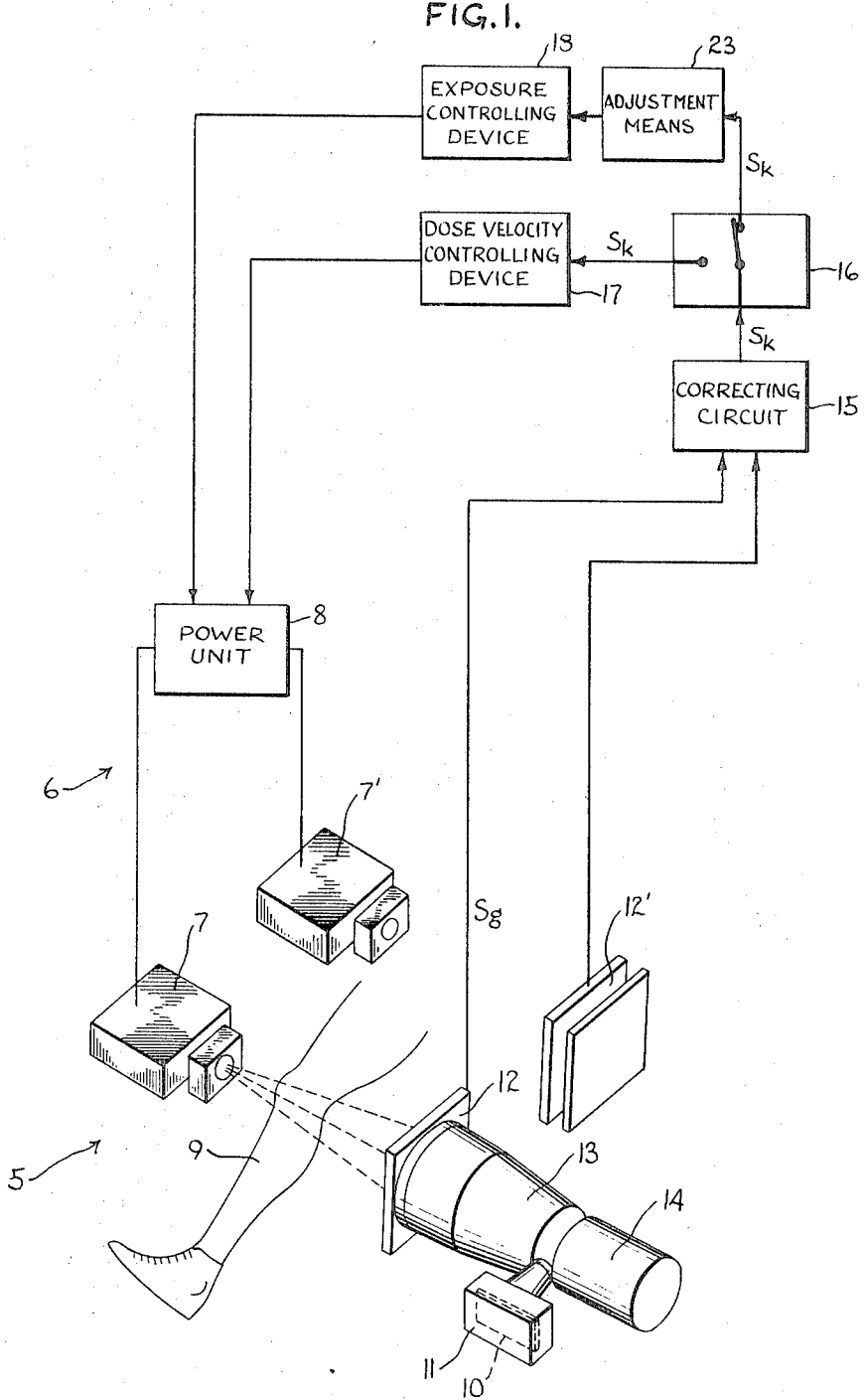
FIG. 1 is a more or less diagrammatic view of apparatus for conducting X-ray examinations, having automatic exposure control means embodying the principles of this invention.

Referring now to the accompanying drawings, the numeral 5 designates generally an X-ray examination plant that is adapted for both radioscopy and photography, having an X-ray generator 6 comprising an X-ray tube 7 and a control and power supply and which will be understood to have certain convention manually controllable adjustment means. X-rays from the tube 7 are beamed through a subject 9 to be examined either directly onto a film or other sensitized element, for radiography, or onto a fluorescent screen which is photographed by a still or motion picture camera 11, containing a film 10, for fluorography or kinefluorography.

A transducer 12 is arranged to be responsive to radiation that has passed through the subject to detect the intensity of the radiation affecting the sensitized element. Such transducers are known, and therefore the transducer 12 is not illustrated in detail. In general, it can comprise a fluorescent screen which is capable of converting X-rays to luminescence and one or more photoelectric cells arranged to respond to the intensity of such luminescence by producing an electrical output signal. An ionization chamber could also be employed as a transducer that is directly responsive to radiation intensity. It will be appreciated that the output signal from the transducer, which is herein designated $S_g$, is produced continuously during the time that radiation is generated, and that the magnitude of $S_g$ at any instant is a function of the intensity of radiation that has passed through the subject, whether such radiation is affecting a sensitized element directly (radiography) or indirectly (fluorography).

Supplementing the apparatus required for photography, the examination plant 5 can also comprise an image amplifier 13, for converting to visible light the radiation which affects the transducer and amplifying such light so that an image of the subject 9 being examined will be visible on an output screen of the image amplifier. Alternatively, the visible image can be scanned by a television camera 14, to be reproduced on a television monitor (not shown).

As illustrated, the X-ray plant can include at least one additional X-ray tube 7' and its corresponding transducer 12' and image producing means. These are so located as to facilitate examination of different parts of the subject and can be connected to the same control and power unit 8, but it will be understood that the several generator-transducer pairs are arranged to be energized alternatively so that only one at a time is in operation.

The output signal $S_o$ from the transducer 12 (or from the transducer 12') can be employed either for radioscopy or for photography. In radioscopy it is utilized for maintaining a substantially constant radiation intensity, to insure that the brightness level on the screen being observed will maintain a substantially constant value despite variations in the opacity of the subject, as more fully explained in the copending application of Ohlsson et al., Ser. No. 813,661, filed Apr. 4, 1969. In photography the signal $S_o$ is utilized for controlling the time of exposure, as more fully explained hereinafter.

The transducers 12 and 12' are connectable alternatively to a correcting circuit 15 by which the signal $S_o$ is modified to accommodate and compensate for certain factors that are common to both of its modes of utilization, namely, correction for dark current of the transducer, correction for the diaphragm of the pencil of X-rays, correction for the response curve of the transducer and the image amplifier with variation in the hardness of radiation (kv.-number), and an averaging correction for the number be understood that the exposure controlling device is active photoelectric cells in the transducer that is operating. The signal $S_k$ that issues from the correcting circuit 15 is thus a continuous output having a magnitude which depends upon the value of $S_o$, as corrected for the factors just mentioned.

By means of a selector switch 16, the output of the correcting circuit can be fed either into a dose velocity controlling device 17, for use in radioscopy, or into an adjustment means 23 and thence into an exposure controlling device 17 is connected with the power unit for the X-ray tube and automatically maintains a constant luminosity of the image being examined.

The exposure controlling device 18, with which the present invention is mainly concerned, serves for automatically controlling each exposure during photography. Before the signal $S_k$ is fed into it, that signal is corrected by means of the adjustment means 23 for certain factors peculiar to photography as distinct from radioscopy, namely film sensitivity and picture ratio. The compensated output signal from the adjustment means is designated $S_i$ and is fed into the exposure controlling device, to which the adjustment means can be permanently connected.

The general purpose of the exposure controlling device is to govern the period of exposure of the sensitized element in accordance with the intensity of the X-rays through the subject during the exposure period, so that, other things being equal, the developed film will have the desired blackening. It will be understand that the exposure controlling device is useful for both single exposure (still) photography and for controlling each exposure frame in X-ray motion picture work (kinefluorography).

Figure 2:
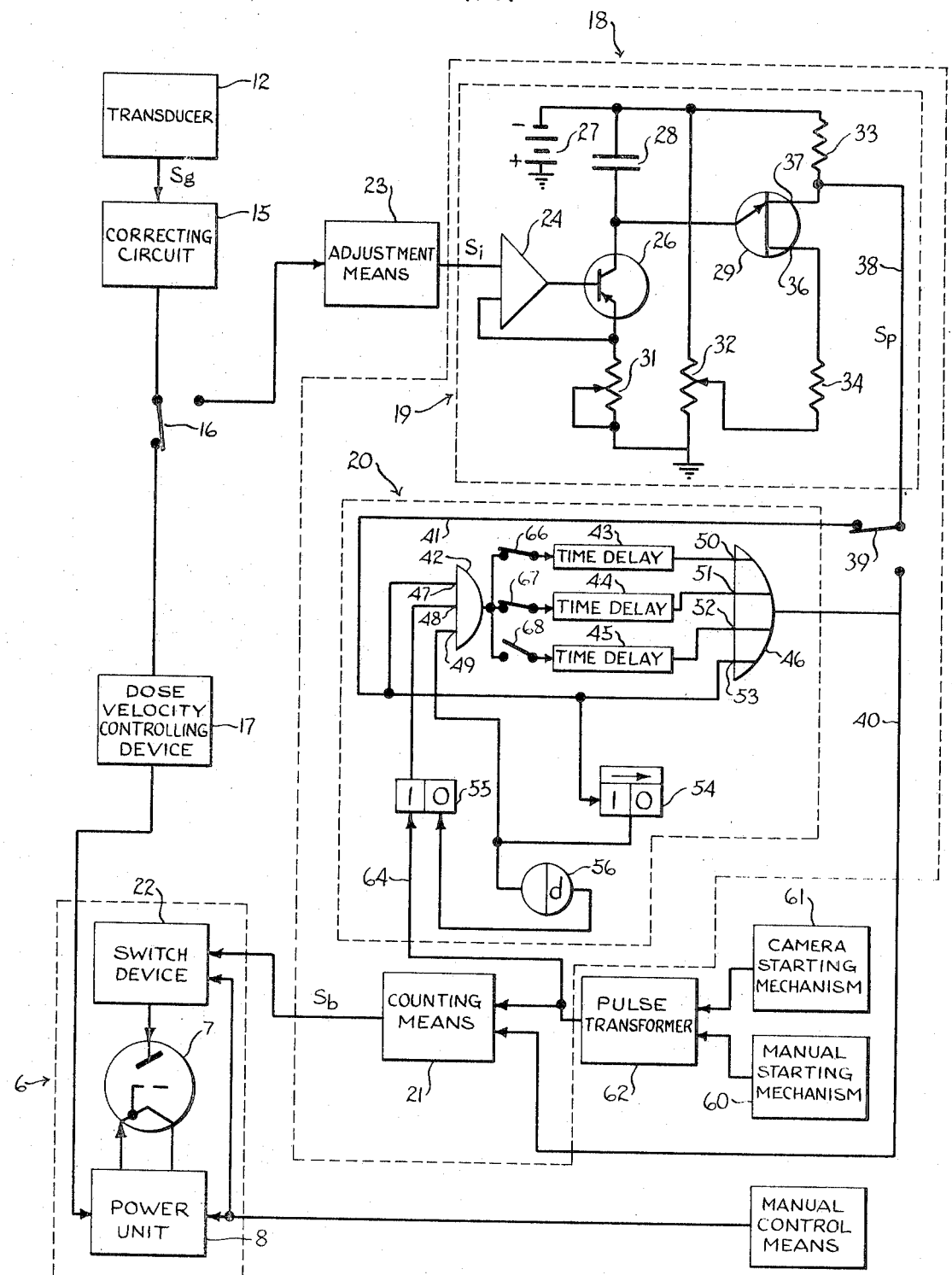
FIG. 2 is a block diagram of the automatic exposure control means.

In general, as best seen in FIG. 2, the exposure controlling device 18 comprises a pulse generator 19 which receives the signal $S_i$ from the adjustment means 23 and produces prime current pulses at a frequency which is a function of the magnitude of $S_i$, a pulse multiplier 20 which, during a predetermined interval near the beginning of each exposure, produces at least one additional pulse for each prime pulse, issuing such additional pulses in time-delayed relation to the prime pulse and to one another, and a counting means 21 connected with both the pulse generator and the pulse multiplier. The counting means 21 receives and counts both prime pulses and additional pulses, and when it receives the last of a predetermined total number of pulses it issues a signal to a switch device 22 that controls the power unit 8. The total number of pulses for which the counter 21 is adjusted corresponds to the quanta of radiation for the exposure desired; the number of additional pulses that are issued during the interval when the pulse multiplier 20 is operative affords a compensation for the inherent delay in operation of the switch device 22.

The output signal $S_i$ from the adjustment means is fed into one of the inputs of a DC amplifier 24 which comprises a part of the pulse generator. The pulse generator integrates the signal $S_i$ with respect to time and issues a prime pulse each time the integral attains a small predetermined value. Since the magnitude of $S_i$ is a function of radiation intensity, the issuance of each prime pulse signifies that the sensitized element 10 has been subjected to a predetermined small quantum of radiation.

The output of the DC amplifier 24 is connected with the base of a transistor 26 that is connected in a more or less conventional pulse generating circuit which is powered from a suitable DC source 27 and which, as illustrated comprises a capacitor 28, a unijunction transistor 29 a pair of variable resistors 31 and 32 and a pair of fixed resistors 33 and 34.

The emitter of transistor 26 is connected with the other input of the DC amplifier 24 and also, through variable resistor 31, with the positive terminal of the DC source 27. The collector of the transistor 26 is connected with the emitter of the unijunction transistor 29 and also with one terminal of the capacitor 28, the other terminal of the capacitor being connected with the negative terminal of the DC source 27. A collector 36 of the unijunction transistor 29 is connected, through the fixed resistor 34, with the movable contact of the variable resistor 32, which is connected across the DC supply 27. The other collector 37 of the unijunction transistor is connected with the output line 38 of the pulse generator and also, through the fixed resistor 33, with the negative terminal of the DC supply 27.

By means of the circuit comprising the DC amplifier 24, the transistor 26 and the variable resistor 31, the condenser 28 is charged with a current which is maintained proportional to the input signal $S_i$ independently of the condition of charge of the condenser. The magnitude of that charging current can be varied by adjustment of the variable resistor 31. When the voltage across the condenser reaches the value corresponding to the breakdown voltage of the unijunction transistor 29, the condenser is very rapidly discharged through the unijunction transistor and the resistors 34 and 32. As a result of this condenser discharge, a current pulse is fed into the output conductor 38. So long as there is an input signal $S_i$ to the pulse generator, recharging of the condenser 28 begins immediately after each pulse is emitted, so that the interval between consecutive prime pulses is a function of the mean intensity of the X-rays affecting the sensitized element during that interval.

The particular pulse generator 19 here illustrated and above described is merely exemplary of several different types of such devices that are familiar to those skilled in the art. Thus, functionally equivalent transistor circuit means can be substituted for the unijunction transistor 29, or the pulse generator could comprise a bistable flip-flop circuit suitably modified.

The output conductor 38 from the pulse generator can be connected to a selector switch 39 which adapts the exposure timing apparatus for different X-ray plant installations. By means of the switch 39 the pulse output $S_p$ of the pulse generator can be fed directly to the counting means 21, through a conductor 40, in cases where there is no significant time delay in the response of the switch device 22, or the prime pulses can be fed to the counter through the pulse-multiplying means 20, which compensates for delay in response of the switch device. It is assumed in the following description that the switch device 22 has a substantial inherent delay and that the switch 39 is maintained in the position shown so that the pulse multiplier is operative.

The pulse multiplier comprises, in general, an AND gate 42 having three input terminals, three time delay circuits 43, 44 and 45 which have different delay periods and which are connected with the output side of the AND gate, and an OR gate 46 having four input terminals. The time delay circuits are all connected with the output terminal of the AND gate 42, through respective control switches 66, 67, 68, and they are respectively connected with the input terminals 50, 51, 52 of the OR gate 46.

The connection between the selector switch 39 and the pulse multiplier comprises a conductor 41 which has one branch connected with an input terminal 47 of the AND gate 42, another branch connected with the fourth input terminal 53 of the OR gate 46, and a third branch connected to the trigger input terminal of the monostable flip-flop circuit 54.

As the description proceeds it will be apparent that the monostable flip-flop circuit 54 determines the period of time in which the pulse multiplier is operative during each exposure, while a bistable flip-flop circuit 55 cooperates with a differentiating unit 56 to prevent the pulse multiplier from being effective during the remainder of the exposure interval following that period of time, and resets the pulse multiplier for the next exposure interval.

At the beginning of an exposure interval—either for a still picture or for a motion picture frame—a distinctive starting impulse is given to the X-ray mechanism, either from a manual starting mechanism 60 (used for still photography) or from a camera starting mechanism 61 used in kinefluorography. Both of these starting mechanisms are connected with a pulse transformer 62 which, in response to an input from either of them, issues the starting impulse. This starting impulse is fed through the counting means 21 to the switch device 22. It is also fed to the bistable flip-flop circuit 55, through branch conductor means 64, to convert it from its 0 to its 1 condition. The bistable flip-flop circuit is connected with the terminal 48 of the AND gate 42, and the imposition of its 1 output upon the AND gate establishes a condition which is required for the monostable flip-flop circuit to respond to the first prime pulse, as described hereinafter.

With the X-ray generator in operation, a signal $S_i$ is of course fed to the pulse generator 19, which begins to emit prime pulses. In addition to being fed to the counter 21 through the terminal 53 of the OR gate 46, each prime pulse is of course imposed upon the terminal 47 of the AND gate, but it cannot pass the AND gate unless the monostable flip-flop circuit 54, which is connected with terminal 49 of the AND gate, is in its 1 position. The monostable flip-flop circuit is in its 0 condition when the first prime pulse arrives at the AND gate, but because the bistable flip-flop circuit 55 is already in its 1 condition, that first prime pulse triggers the monostable flip-flop 54 to its 1 condition. The AND gate condition is then fulfilled, and the second and subsequent prime pulses can therefore pass the AND gate and into the time delay circuits, until such time as the monostable flip-flop circuit reverts to its 0 condition, as it does after a predetermined interval.

The number of time delay circuits to be operative is manually selectable by means of the switches 66, 67, 68 in dependence upon the time delay inherent in the switch device 22. Assuming that only the two time delay circuits 43 and 44 are connected to be operative, as shown, each prime pulse that passes the AND gate to those time delay circuits produces an additional pulse from each of those time delay circuits. Thus, a brief moment after each such prime pulse, the time delay circuit 43 will emit an additional pulse to its terminal 50 of the OR gate and thence, by way of the conductor means 40, to the counter 21; and after another brief interval another additional pulse will be emitted by the time delay circuit 44 to its OR gate terminal 51 and thence, by way of conductor means 40, to the counter 21. Note that the additional pulses corresponding to each prime pulse are in time-delayed relationship to their respective prime pulses and to one another. Of course the prime pulses that pass the AND gate to activate the time delay circuits are also being fed directly to the counter, by way of OR gate terminal 53 and conductor 40, as described above.

The emission of additional pulses from the pulse multiplier continues until the monostable flip-flop circuit 54 reverts from its 1 to its 0 condition. When it does so, its 1-0 transient is preserved by the differentiating unit 56, which in turn causes the bistable flip-flop circuit 55 to reset itself to its 0 condition, thus opening the AND gate 42 so that no further prime pulses can be fed to the time delay circuits until a new exposure is initiated by one of the starting mechanisms 60 or 61. Such resetting of the bistable flip-flop circuit to its 0 condition, in cooperation with the AND gate, also prevents a subsequent prime pulse during the same exposure interval from resetting the monostable flip-flop circuit 54 back to its 1 condition.

The number of additional pulses generated during each exposure by the pulse multiplier depends upon the number of time delay circuits that are rendered operative and the time during which the monostable flip-flop circuit 54 remains in its 1 condition. These magnitudes are chosen to suit each separate X-ray generator, with particular reference to the time delay inherent in its switch means.

It will be apparent that the herein illustrated pulse multiplying means is merely illustrative, and that other frequency-multiplying means could be used, as for example an ordinary frequency doubler, although in that case only an even number of additional pulses would be generated for each prime pulse.

The counting means 21 comprises a conventional binary counter having a zero setting. It is arranged to be set to zero by its receipt of a starting impulse from the pulse transformer 62. Although there may be some delay between issuance of the starting impulse and the actual beginning of radiation, due to inertia in the switch means 22, the interval of such delay is not taken into account in the time of the exposure, since no radiation intensity signal $S_i$ is produced until radiation actually begins, and the time of exposure is thus controlled solely in response to radiation.

Figure 3:
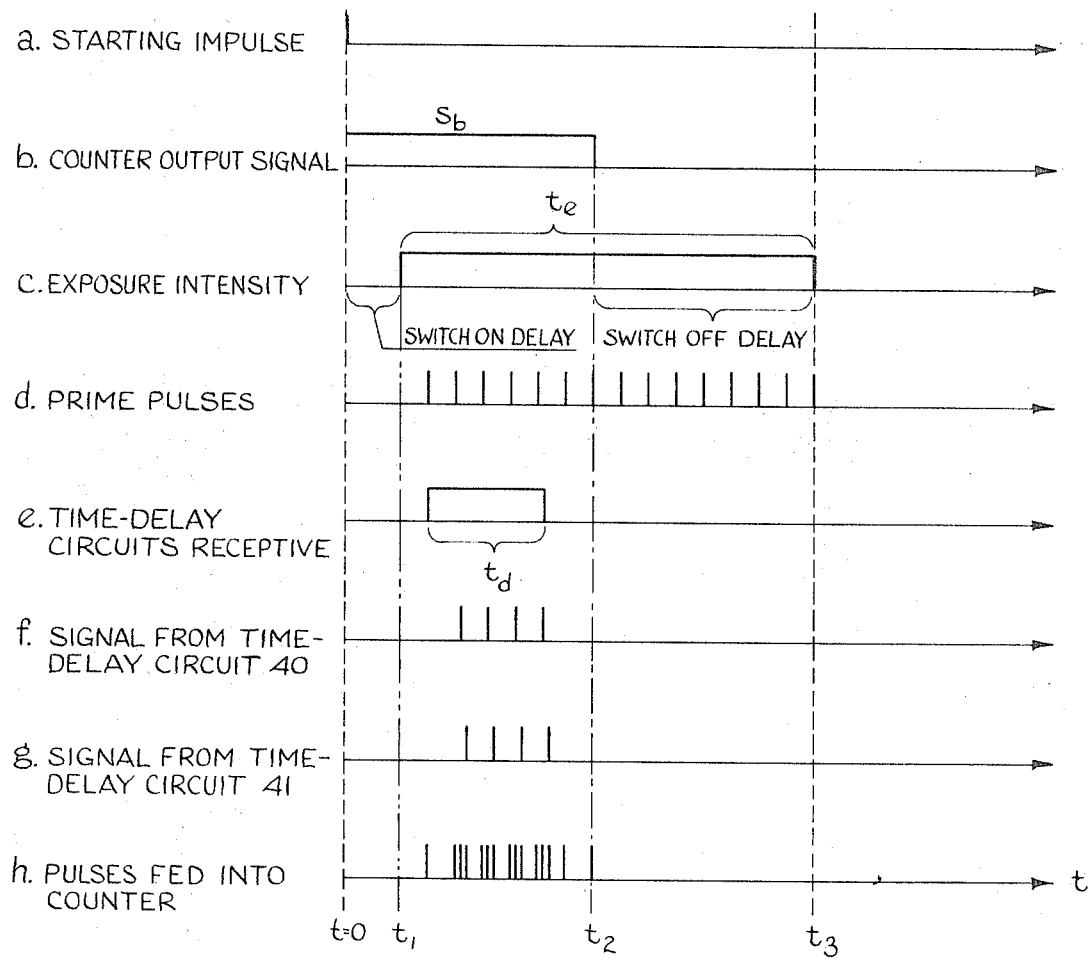
FIG. 3 is a voltage-time diagram showing signals which are produced in different parts of the apparatus illustrated in FIG. 2 during the course of an exposure.

The method of timing an exposure in accordance with the principles of this invention will be further apparent from FIG. 3, which presents graphically the several signals that are generated during the course of an exposure and the respective times at which they are produced. It is again assumed in connection with FIG. 3 that only the two time delay circuits 43 and 44 are operatively connected, and that the appropriate presettings have been made in the manual adjustment means of the correcting circuit 15 and the adjustment means 23.

Line $a$ of FIG. 3 shows a starting impulse delivered from the pulse transformer 62 at a time $t=0$ to set the counter 21 to zero and to initiate closure of the switch device. The switch device responds to a continuous output signal $S_b$ from the counting means, illustrated on line $b$. The signal $S_b$ is initiated with issuance of the starting impulse and terminates at the time when the counter 21 has received the last of a predetermined total number of pulses. Termination of the counting means output signal $S_b$ is in effect the signal which initiates opening of the switch device 22.

Line $c$ depicts the duration of the radiation intensity signal $S_i$, the input signal to the pulse generator, which substantially corresponds to the radiation intensity signal $S_g$. Signal $S_i$ begins at a time $t_1$, a short while after the beginning of the switch control signal $S_b$ (the delay being of course due to the closing inertia of the switch mechanism), and it terminates at a time $t_3$. The period from $t_1$ to $t_3$ is the desired exposure interval established by the apparatus. For purposes of illustration it is assumed that the magnitude of the signal $S_i$ (and its correlative, $S_g$) is constant through the exposure interval.

Beginning with the appearance of the radiation intensity signal $S_i$, the pulse generator 19 issues prime pulses at a frequency which is a function of the magnitude of $S_i$. These prime pulse signals are depicted on line $d$ of FIG. 3, where it will be noted that the first prime pulse appears a brief interval after the commencement of the $S_i$ signal, with successive prime pulses appearing at equal intervals thereafter, the uniformity of these intervals being due to the unvarying magnitude assumed for $S_i$. In practice, the magnitude of the signal $S_i$ may vary during the exposure period, and the intervals between prime pulses will vary correspondingly, becoming shorter with increasing magnitude of the $S_i$ signal. It will also be noted that prime pulses are produced throughout the exposure period, to avoid some measure of unnecessary complexity in the apparatus that would be involved in discontinuing their production after the switch-off signal had been issued at the time $t_2$.

The first prime pulse sets the monostable flip-flop circuit 54 to its 1 condition, initiating a period $t_d$, denoted in line e of FIG. 3, during which the monostable circuit remains in its 1 condition and prime pulses are fed into the time-delay circuits. The duration of the period $t_d$ is chosen to suit the particular X-ray generator, with reference to the delay interval of its switch means and the number of time-delay circuits effectively operative in the exposure timing means.

During the period $t_d$, each prime pulse fed into the time delay circuit 43 will cause that circuit to emit an additional pulse, as depicted on line f of FIG. 3. Each such additional pulse follows its prime pulse after a brief time interval. Similarly, as depicted in line g, the time delay circuit 44 issues an additional pulse at a somewhat longer time delay interval following each prime pulse.

All of the pulses, both prime pulses and additional pulses, are fed into the counter 21, so that the pulses which it receives are as depicted in line h. The total number of pulses to which the counter is responsive corresponds to the quanta of radiation required to attain the desired blackening of the film, and when this number of pulses (from whatever source) has been fed to the counter, it terminates the radiation signal (line b of the FIG. 3), or, in effect, gives a switch-off signal at the instant $t_2$. Because of the switch delay, radiation does not terminate until the instant $t_3$. During the delay interval $t_2$ to $t_3$, the film is subjected to an X-ray dose corresponding to eight prime pulses (compare lines c and d), and it will be seen that exactly eight pulses from the time delay circuits have been fed to the counter in addition to the prime pulses affecting it, so that a precise compensation for the delay interval has been made.

If the intensity of radiation were greater, the frequency of prime pulses would be higher and therefore a larger total number of pulses would be fed to the counter during the interval $t_d$ in which the monostable flip-flop was in its 1 condition, with the result that the switch-off signal would be issued at an earlier time, but again the number of additional pulses issued from the time delay circuits during the $t_d$ interval would substantially correspond to the quanta of radiation affecting the sensitized element during the period of switch-off delay $t_2$ to $t_3$, and the sensitized element would receive exactly the desired dose of radiation, corresponding to the same number of prime pulses.

From the foregoing description taken with the accompanying drawings it will be apparent that this invention provides a method and means for timing the period of radiation for an exposure during X-ray photography, whereby accurate and automatic compensation is made for delay in the opening of the switch means that controls the X-ray generator.

We claim:

1. In apparatus for examining a subject by means of X-ray radiation, of the type comprising a generator of X-ray radiation, starter means for initiating operation of the radiation generator, means for exposing a sensitized element by radiation from the generator that has passed through a subject to be examined, a transducer for producing an output which varies in dependence upon the intensity of radiation to which the sensitized element is being subjected, and signal-responsive switch means operative after a delay interval following receipt of a signal to terminate operation of the radiation generator, timing means for automatically issuing a signal to the switch means at a time to cause generation of radiation to be terminated when the sensitized element has been subjected to predetermined quanta of radiation, said timing means comprising:

a. pulse generating means connected with the transducer and responsive to its output for generating pulses at a frequency which is a function of radiation intensity;

b. pulse multiplying means for producing in response to each generated pulse at least one additional pulse which closely follows in time but is distinct from the generated pulse;

c. a counter connected with the pulse generating means to receive pulse signals therefrom and to produce an output signal promptly upon receipt of the last of a predetermined number of pulse signals;

d. means connecting the counter with the switch means for imposing the output signal from the counter upon the switch means to initiate actuation thereof; and e. means operable in response to actuation of said starter means for connecting said pulse multiplying means in circuit with the pulse generating means and the counter for a predetermined time period beginning shortly after each initiation of radiation generation, to cause additional pulses to be supplied to the counter during said time period so that the instant at which the counter issues a signal to the switch means is advanced to compensate for said delay interval.

2. In the process of examining a subject by exposing a sensitized element with X-ray radiation from a generator that has passed through the subject, with the use of apparatus comprising switch means for terminating radiation generation, said switch means being of a type that is actuated by a signal and effects termination of radiation generation only after a delay interval following its receipt of such signal, the method of controlling duration of a period of generation of radiation to insure that the sensitized element is exposed with predetermined quanta of radiation despite the delay interval of the switch means, which method is characterized by:

a. continuously from the beginning of the exposure period detecting the intensity of the radiation affecting the sensitized element;

b. integrating intensity of radiation with respect to time;

c. each time the integral of radiation intensity with respect to time equals a predetermined small value, generating a prime pulse;

d. during a predetermined interval beginning shortly after the beginning of the exposure period, generating at least one secondary pulse for each prime pulse, said secondary pulses being in briefly time-delayed relation to the prime pulse and to one another;

e. counting all of the generated pulses from the beginning of the exposure period; and f. substantially simultaneously with the last of a predetermined number of pulses counted, issuing a signal to the switch means.

3. In the process of examining a subject by exposing a sensitized element with X-ray radiation passed through the subject from a generator, with the use of apparatus comprising signal-responsive switch means for controlling the generator, said switch means being of a type which interposes a delay between its receipt of a switch-off signal and the termination of radiation generation, the method of so controlling the time of issuance of a switch-off signal to the switch means after the beginning of a period of radiation generation as to insure that the exposure of the sensitized element will be with desired quanta of radiation despite the delay of the switch means, which method is characterized by:

a. continuously from the beginning of the period of radiation generation detecting the intensity of radiation affecting the sensitized element;

b. issuing a prime pulse signal whenever the sensitized element has been subjected to quanta of radiation equal to a predetermined fraction of said desired quanta, so that the frequency of said prime pulse signals is a function of radiation intensity;

c. during a predetermined time interval beginning early in the exposure period issuing at least one supplementary pulse signal for each prime pulse signal, said supplementary pulse signals being in briefly time-delayed relation to the prime pulse signal and to one another;

d. counting all of the pulse signals issued from the beginning of the exposure period; and
e. when the number of pulse signals counted, multiplied by said fraction equals unity, promptly issuing the switch-off signal.

UNITED STATES PATENT OFFICE
CERTIFICATE OF CORRECTION

Patent No. 3,573,461            Dated April 6, 1971

Inventor(s) Stig Arne Ohlsson

It is certified that error appears in the above-identified patent and that said Letters Patent are hereby corrected as shown below:

Column 1  line 16:   Change "of" to --on--

Column 2  line 44:   Change "convention" to --conventiona

Column 3  lines 27-28  Delete "be understood that the ex-
                       posure controlling device is-- and
                       insert --of--
                       (Specification page 9, lines 6-8)

Column 3  line 36:   after "exposure controlling device
                     insert --18, for photography. The
                     dose velocity controlling device--
                     (Specification page 9 lines 18-19)

Signed and sealed this 19th day of October 1971.

(SEAL)
Attest:

EDWARD M. FLETCHER, JR.
Attesting Officer

ROBERT GOTTSCHALK
Acting Commissioner of Pat